US012742438B2

(12) United States Patent
Nielsen

(10) Patent No.: US 12,742,438 B2
(45) Date of Patent: Sep. 22, 2026

(54) CONTROL DEVICE AND METHOD OF CONTROLLING A WIND TURBINE

(71) Applicant: Siemens Gamesa Renewable Energy A/S, Brande (DK)

(72) Inventor: Anders Vangsgaard Nielsen, Silkeborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 639 days.

(21) Appl. No.: 17/761,609

(22) PCT Filed: Sep. 11, 2020

(86) PCT No.: PCT/EP2020/075453

§ 371 (c)(1),
(2) Date: Mar. 18, 2022

(87) PCT Pub. No.: WO2021/063650

PCT Pub. Date: Apr. 8, 2021

(65) Prior Publication Data

US 2022/0372952 A1 Nov. 24, 2022

(30) Foreign Application Priority Data

Sep. 30, 2019 (EP) .................................... 19200503

(51) Int. Cl.
*F03D 7/02* (2006.01)
*F03D 13/20* (2016.01)

(52) U.S. Cl.
CPC ......... *F03D 7/0224* (2013.01); *F03D 7/0232* (2013.01); *F03D 7/0276* (2013.01);
(Continued)

(58) Field of Classification Search
CPC .. F03D 1/0685; F03D 1/06495; F03D 7/0224; F03D 7/0232; F03D 7/0252;
(Continued)

(56) References Cited

U.S. PATENT DOCUMENTS

2011/0076142 A1 3/2011 Veldkamp et al.
2011/0110777 A1 5/2011 Abdallah et al.
(Continued)

FOREIGN PATENT DOCUMENTS

CN 101903646 A 12/2010
CN 102032110 A 4/2011
(Continued)

OTHER PUBLICATIONS

International Search Report & Written Opinion for PCT/EP2020/075453 issued Jan. 18, 2021.

*Primary Examiner* — Sang K Kim
(74) *Attorney, Agent, or Firm* — Schmeiser Olsen PLLC

(57) ABSTRACT

Provided is a control device configured to control a wind turbine, the wind turbine including a rotor being rotatable about a rotational axis, wherein the rotor has at least one blade, the blade including at least one add-on member which is actuated by a corresponding trim actuator to alter aerodynamic properties of the blade and a pitch actuator to alter a pitch angle of the blade. The control device is configured to determine an idling mode or a self-sustaining mode of the wind turbine; to control the pitch actuator to set a predetermined pitch angle of the blade, if the idling mode or the self-sustaining mode is determined; and to cause a target rotational speed of the rotor by variably controlling the trim actuator of the blade, if the idling mode or the self-sustaining mode is determined.

12 Claims, 2 Drawing Sheets

(52) U.S. Cl.
CPC ........ *F03D 13/20* (2016.05); *F05B 2270/101* (2013.01); *F05B 2270/328* (2013.01)

(58) Field of Classification Search
CPC ............ F03D 7/0276; F05B 2240/3052; F05B 2240/3062; F05B 2270/101
See application file for complete search history.

(56) References Cited

U.S. PATENT DOCUMENTS

| | | | | |
|---|---|---|---|---|
| 2011/0221193 | A1* | 9/2011 | Kalen | F03D 7/0212 290/44 |
| 2012/0104757 | A1 | 5/2012 | De Las Heras Carbonell et al. | |
| 2012/0134814 | A1* | 5/2012 | McGrath | F03D 7/0264 416/23 |
| 2013/0134711 | A1* | 5/2013 | Spruce | F03D 7/0232 290/44 |
| 2014/0017079 | A1 | 1/2014 | Grabau | |
| 2016/0076516 | A1* | 3/2016 | Butterworth | F03D 7/022 416/1 |
| 2016/0377057 | A1* | 12/2016 | Caponetti | F03D 9/25 416/1 |
| 2018/0058424 | A1 | 3/2018 | Egedal et al. | |
| 2022/0025860 | A1 | 1/2022 | Egedal et al. | |

FOREIGN PATENT DOCUMENTS

| | | | | |
|---|---|---|---|---|
| CN | 102454548 | A | 5/2012 | |
| CN | 103541862 | A | 1/2014 | |
| CN | 109 441 722 | A | 3/2019 | |
| CN | 113167234 | A | 7/2021 | |
| EP | 2 146 095 | A2 | 1/2010 | |
| EP | 3071831 | A1 | 9/2016 | |
| EP | 3 076 011 | A1 | 10/2016 | |
| WO | 2015/074664 | A1 | 5/2015 | |
| WO | WO-2018162102 | A1 * | 9/2018 | F03D 1/0633 |

* cited by examiner 6
7
3
4
8
5
6
1
2

CONTROL DEVICE AND METHOD OF CONTROLLING A WIND TURBINE

CROSS-REFERENCE TO RELATED APPLICATIONS

This application claims priority to PCT Application No. PCT/EP2020/075453, having a filing date of Sep. 11, 2020, which claims priority to EP Application No. 19200503.1, having a filing date of Sep. 30, 2019, the entire contents both of which are hereby incorporated by reference.

FIELD OF TECHNOLOGY

The following relates to a control device and to a method of controlling a wind turbine.

BACKGROUND

When a wind turbine is not producing power to the grid, the wind turbine is normally put into either idling, i.e., an idling condition where a rotor is spinning with a controlled rotational speed and power is generated to supply the turbine alone (self-sustained turbine, SST), or completely into a stop mode (without rotor rotation). These mode are also referred to as off-grid modes.

In general, securing a stable and safe wind turbine in off-grid situations and/or faulty turbine events is becoming more and more important because offshore wind turbines will be installed further from the shore where an access to the wind turbine is reduced and/or very costly due to the price of offshore service vessels. This makes it important that the wind turbine alone can keep and maintain a stable and safe off-grid condition.

EP 2 146 095 A2 discloses a method of controlling a wind turbine, where a normal pitch strategy is continuously used to control the rotational speed in situations different from normal power production to the grid, i.e., in off-grid situations where the rotational speed is controlled for charging a pitch-drive power-supply backup (e.g., a battery). However, changing the pitch angle in the pitch strategy might induce stress to the system resulting in tear and wear of both pitch actuators and pitch bearings.

SUMMARY

An aspect relates to a control device and to a method of controlling a wind turbine which enable in the idling mode or in the SST mode an improved control of the rotor rotational speed to ensure that loads, wear, tear, power production and structural stability are kept within structural design capacity of the wind turbine.

According to a first aspect of embodiments of the invention, a control device is configured to control a wind turbine, the wind turbine comprising a rotor being rotatable about a rotational axis, wherein the rotor has at least one blade, the blade comprising at least one add-on member which is actuated by a corresponding trim actuator to alter aerodynamic properties of the blade and a pitch actuator to alter a pitch angle of the blade. The control device is configured to determine an idling mode or a self-sustaining mode of the wind turbine; to control the pitch actuator to set a predetermined pitch angle of the blade, if the idling mode or the self-sustaining mode is determined; and to cause a target rotational speed of the rotor by variably controlling the trim actuator of the blade, if the idling mode or the self-sustaining mode is determined.

The active blade add-on member is used to secure a stable rotational speed of the rotor and consequently a stable loading on the turbine and stable power production. For example, the rotational speed can be feedback-controlled (under a closed loop control) by actuating the add-on member of the blade. As a result, pitch loads on the pitch actuator and a blade bearing can be reduced so that the design is more robust and maintenance costs are reduced.

In an embodiment, the control device is configured to hold the predetermined pitch angle of the blade, while the trim actuator of the blade is variably controlled. During the given blade pitch angle, only the active blade add-on member is activated. In this operation, stress to the system is reduced resulting in less tear and wear of both pitch actuators and pitch bearings.

In an embodiment, the control device is configured to select the predetermined pitch angle of the blade out of a plurality of predetermined pitch angles of the blade. Thereby, a fine tuning can be achieved without unduly stressing the pitch actuators and pitch bearings.

In an embodiment, the control device is further configured to cause a trim stall at the blade by controlling the trim actuator of the add-on member. Some wind turbines are already equipped with such active add-on members which are used to cause a trim stall at the blade. Thus, embodiments of the present invention can be implemented in those existing wind turbines by retrofitting without expensive modifications. For example, the software of the control device can be updated, while the hardware is substantially maintained.

In an embodiment, the add-on member is a flap or spoiler at a trailing end or at a leading edge of the blade.

According to a second aspect of embodiments of the invention, a wind turbine comprises a tower; a rotor, the rotor being mounted at the top of the tower to rotate about a rotational axis, wherein the rotor has at least one blade; and the control device.

According to a third aspect of embodiments of the invention, a method of controlling a wind turbine is disclosed, wherein the wind turbine comprises a rotor being rotatable about a rotational axis, wherein the rotor has at least one blade, the blade comprising at least one add-on member which is actuated by a corresponding trim actuator to alter aerodynamic properties of the blade and a pitch actuator to alter a pitch angle of the blade. The method comprises steps of determining an idling mode or a self-sustaining mode of the wind turbine; controlling the pitch actuator to set a predetermined pitch angle of the blade, if the idling mode or the self-sustaining mode is determined; and causing a target rotational speed of the rotor by variably controlling the trim actuator of the blade, if the idling mode or the self-sustaining mode is determined.

In an embodiment, the method further comprises a step of holding the predetermined pitch angle of the blade, while the trim actuator of the blade is variably controlled.

In an embodiment, the method further comprises a step of selecting the predetermined pitch angle of the blade out of a plurality of predetermined pitch angles of the blade. The blade pitch angle can have multiple fixed positions while the blade active add-on members are working so that the blade pitch angle is not continuously changed to secure a stable rotor speed, power production and loads.

In an embodiment, the method further comprises a step of causing a trim stall at the blade by controlling the trim actuator of the add-on member.

In an embodiment, the target rotational speed of the rotor is determined for charging a battery backup of the wind turbine. For example, the rotor torque can be influenced by a State of charge (SoC) which is the level of charge of the battery backup relative to its capacity. Embodiments of the present invention can compensate for such a change of the rotor torque to maintain a stable rotor speed.

It must be noted that embodiments of the invention have been described with reference to different subject matters. Some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, between features of the apparatus type claims and features of the method type claims is considered as to be disclosed with this application.

BRIEF DESCRIPTION

Some of the embodiments will be described in detail, with reference to the following figures, wherein like designations denote like members, wherein.

DETAILED DESCRIPTION

Figure 1:
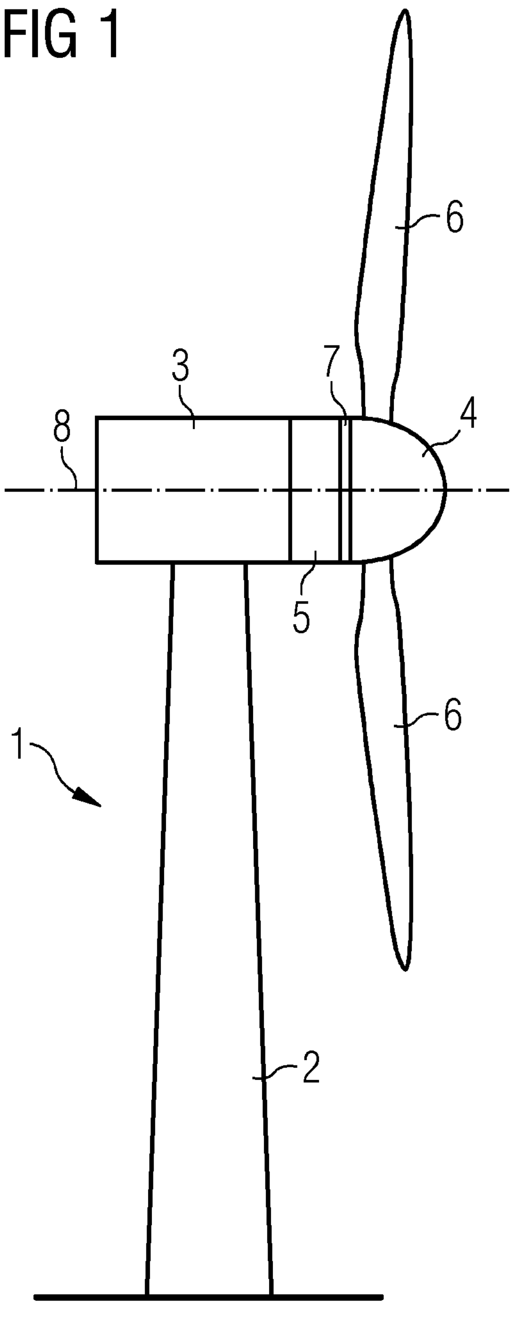
FIG. 1 shows an example of a wind turbine and different elements thereof.

FIG. 1 shows an example of a wind turbine 1. The wind turbine 1 comprises a nacelle 3 and a tower 2. The nacelle 3 is mounted at the top of the tower 2. The nacelle 3 is mounted rotatable with regard to the tower 2 by a yaw bearing (not shown). The yaw bearing may belong to an active yaw system. The axis of rotation of the nacelle 3 with regard to the tower 2 is referred to as the yaw axis.

The wind turbine 1 also comprises a rotor (hub) 4 with three rotor blades 6 (of which two rotor blades 6 are depicted in FIG. 1). The blades 6 are connected to the rotor 4 via a joint section (not shown). Each blade 6 of the wind turbine 1 comprises a pitch actuator (not shown) to alter a pitch angle of the blade 6. The pitch angle usually refers to a rotation of the blade 6 about a longitudinal axis of the blade 6. The rotational speed of the rotor 4 and thus the output power of the generator 5 depend—amongst others—on the pitch angle of the blades 6.

The rotor 4 is mounted rotatable with regard to the nacelle 3 by a main bearing 7. The rotor 4 is mounted rotatable about a rotational axis 8.

The wind turbine 1 furthermore comprises a generator 5. The rotor 4 is connected directly to the generator 5, thus the wind turbine 1 is referred to as a gearless, direct-driven wind turbine. Such a generator 5 is referred as direct drive generator 5. As an alternative, the rotor 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the rotor 4 into electrical energy in the shape of an AC power.

Figure 2:
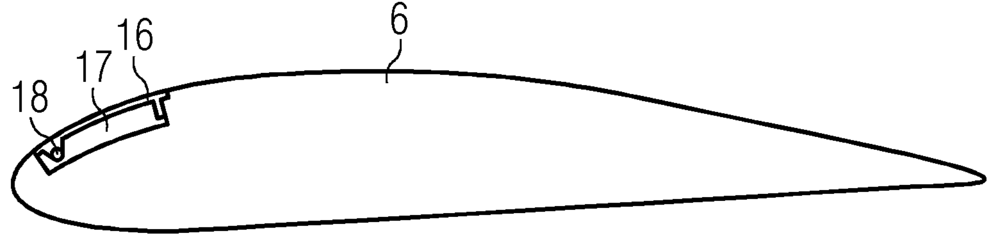
FIG. 2 shows a wind turbine blade having an add-on member.

FIG. 2 shows a wind turbine blade 6 of the wind turbine 1. Each blade 6 has at least one active add-on member 17 which is actuated by a corresponding trim actuator (not shown) to alter aerodynamic properties of the blade 6. The cross-section of FIG. 2 shows only one active add-on member 17; however, additional active add-on members 17 of the blade 6 can be arranged in front of or behind this active add-on member 17.

The add-on member 17 is designed as a spoiler. The spoiler 17 is here arranged near the leading (front) edge of the blade 6, but it can also be arranged near the trailing (back) edge of the blade 6. The add-on member 17 can be accommodated in a recess 16 in the blade 6 and can turn about a hinge 18 by activation of the trim actuator. In FIG. 2, the spoiler 17 is shown in its normal deactivated position, where no spoiler effect and no stall are desired. This position is referred to as a predetermined first position. The predetermined first positions of the add-on members 17 of different blades 6 can be identical to ensure load symmetry when activating a plurality of add-on members 17. This also reduces complexity as one trim actuator (for example a pressure supply or an electro motor) can drive the corresponding add-on members 17 on all blades 6.

Figure 3:
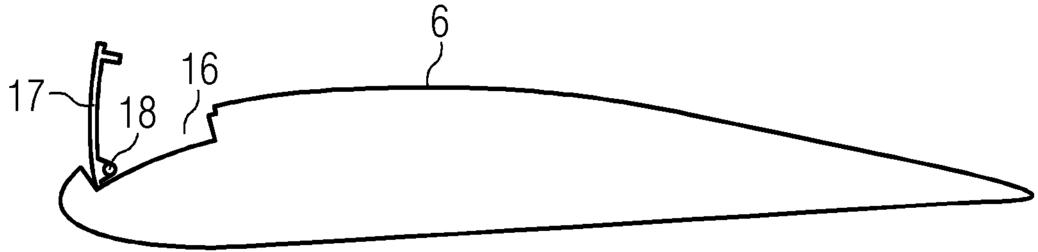
FIG. 3 shows the add-on member in an activated position, where the add-on member is turned to maximum stalling effect.

FIG. 3 shows the same add-on member 17 in an activated position, where the add-on member 17 is turned to a maximum by the trim actuator so that the stalling effect is maximum. This position is referred as a predetermined second position. The predetermined second positions of add-on members 17 of different blades 6 can be identical. This ensures load symmetry when activating the add-on members 17. This also reduces complexity as one trim actuator (for example a pressure supply or an electro motor) can drive the corresponding add-on members 17 on all blades 6.

According to embodiments of the present invention, the add-on member 17 is not necessarily to be formed as spoiler. The add-on member 17 can have any other configuration which is able to alter the aerodynamic properties of the blade 6, for example a flap.

The wind turbine 1 comprises a control device (not shown) which is configured to determine an idling mode or a self-sustaining, SST, mode of the wind turbine 1. The idling mode and the self-sustaining mode are also referred to as off-grid modes where the wind turbine 1 is not connected to the grid or does substantially not supply power to the grid. However, the wind turbine 1 itself needs energy, for example for maintaining an operation of the control device and for charging a battery backup of the wind turbine 1.

The control device is further configured to control the pitch actuator to set a predetermined pitch angle of the blade 6, if the idling mode or the self-sustaining mode is determined, and to cause a target rotational speed of the rotor 4 by variably controlling the trim actuator of the blade 6, if the idling mode or the self-sustaining mode is determined. Thus, the pitch angle of the blade 6 can be locked at a predetermined pitch angle (predetermined position) after an off-grid event has been detected, and the wind turbine 1 can continue in the idling mode or the self-sustaining mode by only using the add-on members 17 of the blade 6 to control a rotational speed of the rotor 4, i.e., to supply electric energy only to the wind turbine 1 itself.

The active blade add-on member 17 is used to secure a stable rotational speed of the rotor 4 and consequently a stable loading on the wind turbine 1 and stable power production. For example, the rotational speed of the rotor 4 can be feedback-controlled (closed loop control) by actuating the add-on member 17 of the blade 6.

In an embodiment, the control device is configured to hold the predetermined pitch angle of the blade 6, while the trim actuator of the blade 6 is variably controlled. In this operation, stress to the system is reduced resulting in less tear and wear of the pitch actuators and of pitch bearings.

In an embodiment, the control device is configured to select the predetermined pitch angle of the blade 6 out of a plurality of predetermined pitch angles of the blade 6. Thereby, a fine tuning can be achieved without unduly stressing the pitch actuators and pitch bearings.

In an embodiment, the control device is further configured to cause a trim stall at the blade 6 by controlling the trim actuator of the add-on member 17. Some wind turbines 1 are already equipped with the active add-on members 17 which are used to cause a trim stall at the blade 6. Thus, embodiments of the present invention can be implemented in those existing wind turbines 1 just by retrofitting without expensive modifications. For example, the software of the control device can be updated while the hardware is substantially maintained.

In a modified embodiment, the above-described control of the control device can be combined with an active yaw control for controlling a rotational speed of the rotor 4.

An active yaw system of wind turbine 1 is responsible for an orientation of the rotor 4 towards the wind, i.e., the yaw system usually aligns the rotational axis 8 to a detected wind direction to obtain the maximum power output. The active yaw system is equipped with a yaw actuator to rotate the nacelle 3 of the wind turbine 1 against the stationary tower 2 based on signals from wind direction sensors or manual actuation (control system override).

In the modified embodiment, the active yaw control is combined with the control of the trim actuator of the active add-on member 17 to control the rotational speed of the rotor 4, the output power of the wind turbine 1 and/or loads.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control device configured to control a wind turbine, the wind turbine comprising a rotor being rotatable about a rotational axis, wherein the rotor has at least one blade, the at least one blade comprising at least one add-on member which is actuated by a corresponding trim actuator to alter aerodynamic properties of the at least one blade and a pitch actuator to alter a pitch angle of the at least one blade, the control device comprising:

a controller configured to:

determine an idling mode or a self-sustaining mode of the wind turbine;

control the pitch actuator to set a predetermined pitch angle of the at least one blade, if the idling mode or the self-sustaining mode is determined; and cause a target rotational speed of the rotor by variably controlling the trim actuator of the at least one blade, if the idling mode or the self-sustaining mode is determined;

wherein the controller is configured to lock the predetermined pitch angle of the at least one blade and cause the target rotational speed of the rotor by only using the trim actuator of the at least one blade, while the trim actuator of the at least one blade is variably controlled.

2. The control device according to claim 1, wherein the controller is configured to select the predetermined pitch angle of the at least one blade out of a plurality of predetermined pitch angles of the at least one blade.

3. The control device according to claim 1, wherein the controller is further configured to cause a stall at the at least one blade by controlling the trim actuator of the at least one add-on member.

4. The control device according to claim 1, wherein the at least one add-on member is a flap or spoiler at a trailing end or at a leading edge of the at least one blade.

5. A wind turbine comprising:

a tower;

a rotor mounted at a top of the tower to rotate about a rotational axis, wherein the rotor has at least one blade; and a control device according to claim 1.

6. The control device according to claim 1, wherein the controller is configured to combine active yaw control with the control of the trim actuator of the at least one add-on member to control the rotational speed of the rotor.

7. The control device according to claim 1, wherein the predetermined first positions of the add-on members of different blades are identical to ensure load symmetry when activating a plurality of add-on members, and wherein one trim actuator drives corresponding add-on members on all blades.

8. A method of controlling a wind turbine, the wind turbine comprising a rotor being rotatable about a rotational axis, wherein the rotor has at least one blade, the at least one blade comprising at least one add-on member which is actuated by a corresponding trim actuator to alter aerodynamic properties of the at least one blade and a pitch actuator to alter a pitch angle of the at least one blade the method comprising:

determining an idling mode or a self-sustaining mode of the wind turbine;

controlling the pitch actuator to set a predetermined pitch angle of the at least one blade, if the idling mode or the self-sustaining mode is determined;

causing a target rotational speed of the rotor by variably controlling the trim actuator of the at least one blade, if the idling mode or the self-sustaining mode is determined; and locking the predetermined pitch angle of the at least one blade and causing the target rotational speed of the rotor by only using the trim actuator of the at least one blade, while the trim actuator of the at least one blade is variably controlled.

9. The method according to claim 8, further comprising:

selecting the predetermined pitch angle of the at least one blade out of a plurality of predetermined pitch angles of the at least one blade.

10. The method according to claim 8, further comprising:

causing a stall at the at least one blade by controlling the trim actuator of the at least one add-on member.

11. The method according to claim 8, wherein the target rotational speed of the rotor is determined for charging a battery backup of the wind turbine.

12. A method of controlling a wind turbine, the wind turbine comprising a rotor being rotatable about a rotational axis, wherein the rotor has at least one blade, the at least one blade comprising at least one add-on member which is actuated by a corresponding trim actuator to alter aerodynamic properties of the at least one blade and a pitch actuator to alter a pitch angle of the at least one blade the method comprising:

determining an idling mode or a self-sustaining mode of the wind turbine; and controlling the pitch actuator to set a predetermined pitch angle of the at least one blade, if the idling mode or the self-sustaining mode is determined;

locking the predetermined pitch angle of the at least one blade and causing a target rotational speed of the rotor by only using the trim actuator of the at least one blade, if the idling mode or the self-sustaining mode is determined;

wherein the target rotational speed of the rotor is determined for charging a battery backup of the wind turbine.

* * * * *